United States Patent

[11] 3,633,105

[72] Inventors Adam Lender
Palo Alto;
Henry H. P. Olszanski, Belmont, both of Calif.
[21] Appl. No. 24,791
[22] Filed Apr. 1, 1970
[45] Patented Apr. 1, 1972
[73] Assignee GTE Automatic Electric Laboratories
Northlake, Del.

[54] DIGITAL ADAPTIVE EQUALIZER SYSTEM
23 Claims, 4 Drawing Figs.

[52] U.S. Cl. 325/42, 325/65, 328/155, 328/162, 333/18
[51] Int. Cl. H04b 15/00
[50] Field of Search 325/42, 65, 38 A; 333/18, 28; 178/69, 68; 328/155, 162

[56] References Cited
UNITED STATES PATENTS

| | | | |
|---|---|---|---|
| 3,524,169 | 8/1970 | McAuliffe | 333/18 X |
| 3,579,109 | 5/1971 | Hatley | 325/42 |

*Primary Examiner*—Robert L. Griffin
*Assistant Examiner*—Kenneth W. Weinstein
*Attorneys*—Kurt Mullerheim, Leonard R. Cool and Russell A. Cannon

ABSTRACT: Because of delay and attenuation distortion a received message data signal may have extreme intersymbol interference which would result in errors in the recovered data. Amplitude as well as phase equalization of the incoming signal may be performed on a decision-directed basis according to the novel alogorithm:

$$C_{j+1} = C_j - P\, Sgn_{\epsilon j}\, Sgn\, X_{ij}$$

where:
$C_j$ = Present value of the $j$th coefficient
$C_{j+1}$ = Next value of the $j$th coefficient
$P$ = Constant
$Sgn\ \epsilon_j$ = Sign of the error
$Sgn\ X_{ij}$ = Sign of signal sample.

While analog implementation is possible, this new algorithm readily permits digital implementation.

In an equalizer based on this new algorithm binary, multilevel or correlative waveform is first converted into an $n$-digit binary code at a sampling rate determined by the data rate. The $n$-digit sample is gated into $n$-shift registers each of which has storage for $k$ samples. The gate is then opened to incoming samples and is closed to permit processing and recycling of the $k$, $n$-digit samples around the register. In order to accomplish the processing before a new sample is introduced, the processing is done at a rate which is equal to the product of the data rate and the sum of the number of shift register stages plus one.

When the samples are read out, they are nondestructively read into a multiplier and back into the register. Each time a new sample is added, the oldest sample is discarded. The signal samples are digitally multiplied by coefficients and the result of $k$ multiplications is summed in an accumulator to obtain an equalized output in binary code form. This equalized output is decoded to obtain the equalized message data signal. The equalized binary code signals are also applied to the error sensing logic circuitry. The output of the error sensing logic is combined in an Exclusive-OR gate with the polarity digit of the signal samples to provide information for correction of the coefficients.

INVENTORS
ADAM LENDER
HENRY H. P. OLSZANSKI
BY
AGENT

DIGITAL ADAPTIVE EQUALIZER SYSTEM

BACKGROUND OF THE INVENTION

1. Field of the Invention

This invention relates to the equalization of transmission channels and more particularly to a time domain equalizer (also called a transversal filter) which is automatically adjusted to correct for the distorting effects of a transmission channel and in which the automatic adjustment is continuous and is based upon information derived from the transmitted data signal, and hence is called adaptive.

2. Description of the Prior Art

In transmission systems a signal which includes a series of individual data or symbol bits is usually transmitted through a band-limited medium in which different frequency components in the signal may be delayed and attenuated by different amounts so that components from more than one of the individual symbol bits may coincidentally arrive at a signal receiver. This simultaneous arrival causes intersymbol interference and adversely affects recovery of the data information. In order to minimize these effects time domain equalizers (transversal filters) have been used for more than 30 years to equalize transmission channels on a manual basis. The basic transversal equalizer consists of three components: (1) a tapped delay line; (2) a set of adjustable attenuators connected to each tap, except for a main tap, which attenuators can be used to multiply the remaining tap signals by any number between plus 1 and minus 1, however, the main tap is usually set to a reference value; and (3) a summing network. The signal enters the delay line and travels to the end of the line where it is dissipated in a nonreflective termination. Tap intervals are equal to the digit (symbol) rate in most applications. The main tap is usually at the center of the delay line, and this tap output is not modified by the attenuators used at the other taps but is accorded its full value. A typical impulse response of a voice circuit has leading and lagging over- and under-shoots often referred to as echoes. These equalizers were designed to force these leading and lagging echoes to zero so as to reduce their effect, i.e., reduce intersymbol interference. Hence, the technique is described as zero-forcing. In the earlier equalizers, a channel would be equalized by transmitting a data signal through the channel and the tap attenuators would be manually adjusted to equalize the channel. Once set, the attenuators would not be changed until further manual adjustment was required. More recently automatic equalizers were developed. These differed from the manual equalizer in that adjustment of the attenuators was accomplished automatically during a training period that was preliminary to message data transmission. Such a timing period often involved a number of seconds and was thus time consuming. The attenuator settings established during the setup period remain fixed throughout the transmission of the message data. An automatic equalization system using such a technique is described in U.S. Letters Pat. No. 3,292,110 issued Dec. 13, 1966.

Since channel characteristics change with time, message data can be adversely affected by changes that can occur during the course of a long message. Rather than to halt message data transmission, it is preferred that means be devised whereby the channel characteristics can be continuously or periodically monitored and, where deviation from optimum is detected, the equalizer tap adjustment would be automatically changed for optimum equalization using the normal message data signals. An example of an adaptive equalizer is given in the U.S. Letters Pat. No. 3,414,819 issued Dec. 3, 1968. As with other prior art equalizer systems this equalizer uses analog techniques, i.e., a tapped delay line and adjustable attenuators. Further, such systems have been normally governed by zero-forcing or modified zero-forcing criterion. Zero-forcing systems eliminate leading and lagging echoes which fall within the range of the tapped delay line. In many instances, where the sum of absolute values of echoes is greater than the main pulse (eye pattern closed), the tails outside of this range are not eliminated and, in fact, may even become worse. The zero-forcing criterion can force echoes nearly to zero over $n-1$ taps within the equalizer but have little influence on the waveform outside the equalizer. Such a criterion is ineffective when the eye pattern before equalization is closed. A better criterion is the mean square error which affects all echoes — those within and those outside the tapped delay line. Another disadvantage of the prior art techniques is that the use of a tapped delay line restricts the effective number of taps that can be used and thus the control range is limited. Further, the fact that tap intervals are directly related to the data rate effectively restricts the use of the equalizer to this data rate for the analog-type equalizers.

A conventional and well-known algorithm which minimizes the mean-square-error (MSE) is:

$$C_{j+1}=C_j+k\overline{\Delta\epsilon_j^2}$$

where $C_{j+1}$ = next value of the coefficient $C_j$ = present value of the coefficient $k$ = negative constant $\overline{\Delta\epsilon_j^2}$ = gradient of the mean square error Error $\epsilon_1$ is defined as the distorted signal minus a predetermined reference. This definition is consistent throughout this application.

A system based on the MSE converges, but has several disadvantages. A serious one is that the convergence time is long — of the order of seconds. Another disadvantage is that it is necessary to measure magnitudes of error and the incoming signal, multiply, then average (or integrate), and change the coefficient by an unequal amount each time. This is cumbersome and complex.

SUMMARY OF THE INVENTION

The algorithm described in this invention has a significant advantage in that the convergence (adaptation) time compared to the conventional MSE algorithm is shorter by a factor of about 100. Further, it is extremely simple and an equalizer based upon this algorithm reflects this simplicity. Since the magnitudes are completely disregarded, there is no averaging or integration required and all coefficients are changed each time by an identical amount. It is capable of equalizing distortion from any kind of sources even when the "eye" is completely closed. Finally, no preamble is necessary and the system operates on a decision-directed basis.

As indicated above, attenuation and, in particular, delay distortion adversely affect the transmission rate of data signals. It has been found that compensation for these adverse effects can be obtained using all-digital techniques by, first, converting the incoming data signal into an $n$-digit code representative of the data signal samples at the data rate; then, multiplying the $n$-digit code by a like number of digits representing the coefficients which are periodically updated during the settling time of the equalizer. In this case the number of digits representing the coefficients is $n$, but it can be any number, more or less than $n$, depending upon the particular requirements. According to one aspect of the invention the coefficients are modified according to the following algorithm:

$$C_{j+1}=C_j - P\,\mathrm{Sgn}\,\epsilon_j - P\,\mathrm{Sgn}\,\epsilon_j\,\mathrm{Sgn}\,X_{ij}$$

where $C_j$ = present value of the $j^{th}$ coefficient $C_{j+1}$ = next value of the $j^{th}$ coefficient $P$ = constant $\mathrm{Sgn}\,\epsilon_j$ = sign of the error $\mathrm{Sgn}\,X_{ij}$ = sign of the signal sample This algorithm is a reasonably good approximation of the mean square error algorithm and is based upon a mean square error rather than a zero-forcing criterion and, as a result, equalization is possible under severe distortion conditions. Further, adverse effects of the zero-forcing criterion on the data signal outside of the tap range of the equalizer are avoided. The algorithm lends itself to analog implementation, i.e., using a tapped delay line. However, with this new algorithm magnitude can be completely disregarded; there is no averaging required and coefficients are each changed an identical amount each time. Thus, the algorithm lends itself to digital implementation which, among other advantages, permits a doubling or quadrupling of the effective number of taps that would be possible by using a tapped delay line. For example, the equivalent of 25 or 50 taps can be quite easily made and the physical size is small, because of the use of large-scale integration techniques that are available for digital integrated circuitry. For an analog tapped delay line 17 taps is about the reasonable maximum number that can be used.

In an exemplary implementation of the invention the plurality of $n$-digit signal samples multiplied by coefficients are added in an accumulator to obtain a compensated $n$-digit output which is used to obtain the corrected data output signal and to provide the error sensing logic. This error logic compares digitally the accumulator output against references to determine the error polarity with respect to data signal slicing levels. The error polarity forms one input to the coefficient correction circuitry. A second input is obtained from the plurality of signal samples and the result of the modulo–2 addition of the two (which corresponds to polarity multiplication) is used to modify the corresponding coefficients. Even with error rates up to 25 percent in the original input data, the settling time, i.e., the time required to reduce the error to zero, of the equalizer is only about 20 milliseconds. In practice tests on transmission media indicate that an error rate of 20 percent is rarely exceeded, if ever.

Accordingly it is one object of the invention to provide an equalizer with a sufficient adaptive control range so that correction for an input signal, having errors of up to 25 percent caused by distortion or other impairments in the transmission channel, can be recovered without errors.

It is another object of the invention to provide an equalizer system that is applicable to data information signals having any kind of predetermined waveform.

It is a further object of the invention to provide an equalizer that is readily adapted for use on signals having different data rates.

Other objects and advantages of this invention will become apparent from a study of the following detailed description and drawings.

DETAILED DESCRIPTION OF THE INVENTION

Figure 1:
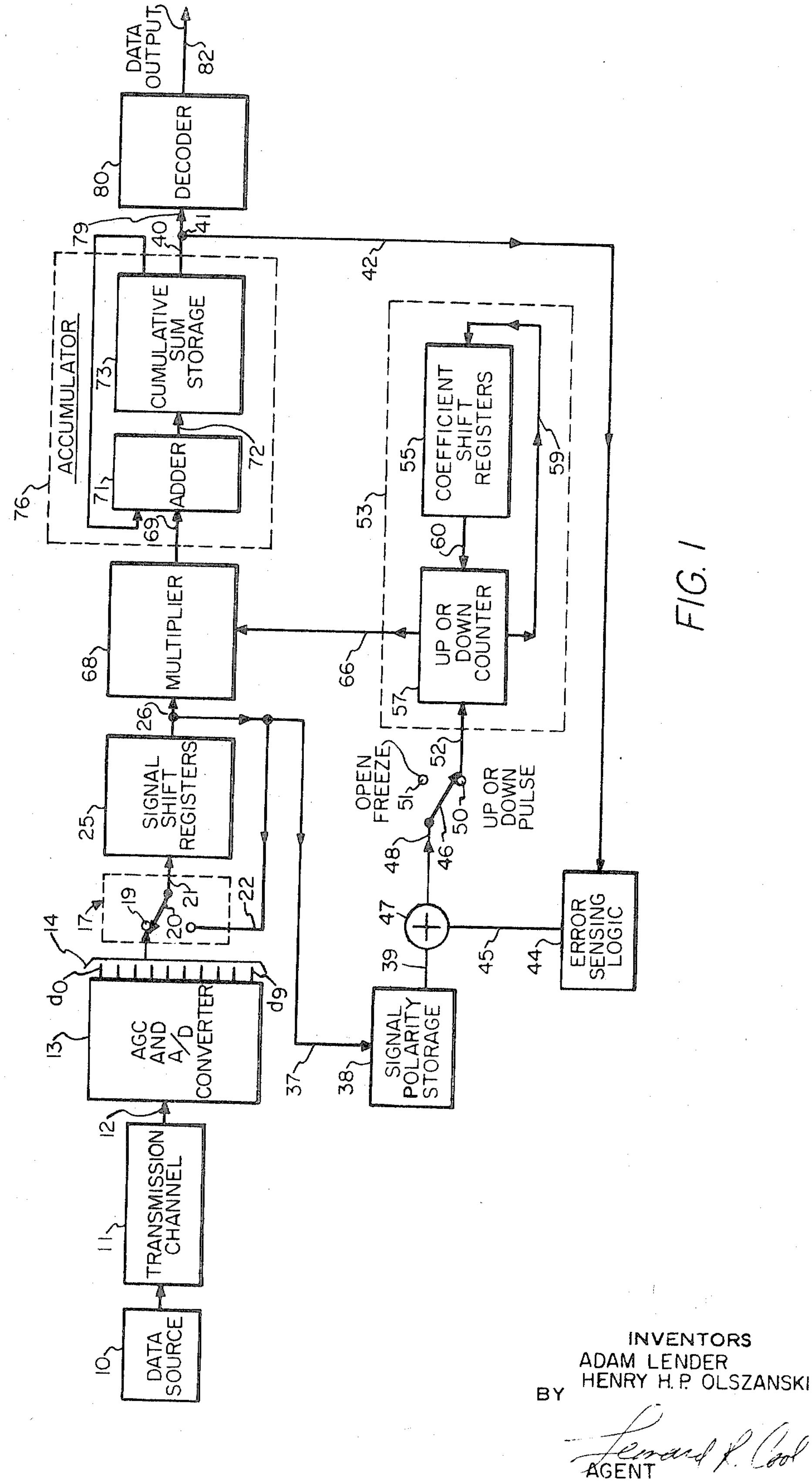
FIG. 1 is a simplified block diagram of an adaptive equalizer system according to the invention.

Referring to FIG. 1, a preferred embodiment of the invention is shown in a typical operating environment. At the transmitting end of the system, data source 10 accepts a binary input and generates a signal that may be binary, multilevel or correlative, such as, for example, duobinary. While baseband transmission is illustrated in the drawing, the line signal into transmission channel 11 could be baseband or at a carrier frequency having undergone modulation in data source 10. If some form of carrier modulation is used, demodulation at the receiver would be necessary before the data signal is applied to the AGC and A/D converter 13. There are a number of modulation techniques that may be employed for data transmission. In order to simplify the drawing none of these techniques were illustrated, but it should be understood that they may be used with the invention.

Because of the bandwidth limitations of the transmission channel, the line signal output on lead 12 has an analog characteristic. Variations in the loss characteristics of the channel will affect the signal output level. Further, because of its differential loss and delay characteristics, various portions of the signal will be attenuated differently and displaced in time and this causes intersymbol interference. At the higher data rates, intersymbol interference makes most of the normally available telephone channels unusable without adaptive equalization. An equalizer system according to this invention was built and successfully operated on dialed-up lines at a bit rate of 4800 b/s.

The input signal can be, at any bit rate, consistent with the transmission medium, but in our example the particular system is a voice channel which accommodates 4,800 digits per second. In this case the transmission channel would have an effective bandwidth of 2,400 Hz., and band-limiting filters are employed to this end. Since the equalizer is digital and employs an A/D converter at its input, the signal is sampled synchronously at the digit rate of data transmission. In all cases for various bit speeds the bandwidth was 2,400 Hz. Such a bandwidth can be occupied by signals having lower or higher bit speeds such as 2,400 b/s, 4,800 b/s or higher — say 7,200 b/s or 9,600 b/s. In all cases for the same 2,400 Hz. the sampling rate necessary is that equal to the digit speed in digits per second. For example, in case of 2,400 b/s a bipolar three-level signal occupying 2,400 Hz. the sampling rate is 2,400 samples per second. For a three-level modified duobinary signal at 4,800 b/s still having the same bandwidth the sampling rate is 4,800 samples per second and so on. Although there is a seeming contradiction with the sampling theorem which requires sampling at a rate of at least twice the highest frequency of any signal occupying 2,400 Hz. bandwidth or 4,800 samples per second, this does not necessarily hold for this system. It depends upon the characteristic of the signal. The practical implemented system incorporated into the operating equipment requires, for example, only 2,400 samples per second for a bipolar signal whose highest frequency is 2,400 Hz. In general, for this system the sampling rate equals the digit speed.

The AGC and A/D converter 13 accepts the analog baseband signal from lead 12, changes the signal amplitude in accordance with the automatic gain control criteria, samples the signal at the digit rate to obtain a PAM signal and converts the PAM signal into an $n$-digit binary code. The above functions may be accomplished by using discrete components, thin-film hybrid techniques, or integrated circuits. While the number of digits in the binary code is not rigidly fixed, the number of digits used should be sufficient to minimize quantizing noise and to avoid excessive loss of accuracy during processing. In a practical system operating over normal voice channels, a 10-digit code was used and the quantizing noise was acceptable and the accuracy following multiplication was adequate. At the output of the A/D converter, 10 output leads are shown and each lead carries one digit of the binary code. These digits are represented symbolically by the designation $d_0$ through $d_9$. The least significant digit is $d_9$ and the most significant digit is $d_0$. In the preferred embodiment of the invention which employs parallel processing of the outputs of converter 13; and individual digit outputs are applied to separate multiplexing gates. Only one such gate 17 is shown in FIG. 1, but it should be understood that one gate would be used for each digit. The multiplexing gate is represented as a single-pole, double-throw switch, but in an actual system electronic switching circuits could be used. These multiplexing gates provide the switching necessary to read new signal samples into the shift registers 25 at the data rate. Once the new sample is read in, the switch is open between the A/D converter and the shift registers, but the second, recycling, circuit is closed so that the signal samples may be recirculated through the shift registers via lead 22 connected between output junction 26 and one terminal of gate 17.

The shift registers 25 store the present PAM sample as well as $(k-1)$ past samples, the value $k$ being equal to the number of stages in the shift registers. Thus a history of the signal is stored in the registers. In an experimental system 50-bit shift registers were used. It was determined, however, that optimum operation is achieved when the main tap is at or near the center and the number of taps is between 25 and 30. New signal samples are read into the registers at the digit or sampling rate which may be equal to the data rate. This is called the framing rate. During the framing period the multiplexing gates are connected to the output of the A/D converter and a 10-digit sample is read into the 10 shift registers. At the same time, the oldest signal sample is discarded. In the interval between framing periods, the digits in each shift register are sampled. One means of doing this is to step the samples through the register and this is illustrated in FIG. 1 by the output at 26 of shift register 25 being applied to the input of said shift register via lead 22, switch 20 of gate 17, and lead 21. Since these are 50-bit shift registers, the rate of operation must be 50 times the framing rate. Further, an additional period is required for reading in the new sample, discarding the oldest sample, and other operations. Thus the number of subframes must be equal to the number of shift register stages plus one ($k+1$). If the digit rate is 4,800 bits per second, the framing rate is 4,800 Hz. For 50-bit shift registers the overall clock rate is equal to the number of subframes in a frame multiplied by the framing rate or in the example case (50 + 1) (4,800 Hz.) = 244.8 kHz.

The signal shift registers are subject to a total of 51 shifts during the entire frame. Consider the effect of shifting through 51 pulses on a particular signal sample. A new sample is entered into the shift register at 4,800 Hz. This sample is entered during the 51st subframe and deposited in position 1 of the shift register. At the same time the oldest sample in position 50 is discarded. In the next frame, after 49 clock pulses in 49 subframes, the same sample will appear in position 50 in the shift register. After the 50th clock pulse it will appear again in position 1 in the shift register. But in the 51st subframe the same sample will move into position 2 of the shift register, thereby making room for the new sample.

Because of the way these shift registers were made, it was necessary that the coded signal samples be stepped through the register for processing. However, other techniques could be employed equally well. For example, it is possible to scan each stage of each register to determine its state.

Processing to obtain equalization for attenuation and delay distortion is achieved by performing the following operation in between the framing pulses:

1. Multiplication of $k$ signal samples by $k$ coefficients in a digital manner;
2. cumulative addition of the $k$ results of the multiplications of (1) above;
3. error sensing which is based on the assumption that a level appearing at the output of (2) above belongs to that signal level which it most nearly approximates;
4. adjustment of the coefficients in accordance with the algorithm, which requires only a knowledge of the sign of the error and the signal sample and adjusting only one step at a time in the up/down counter; and
5. decoding of the equalized signal to binary form.

Each of these functions and their interrelationships are shown in a conceptual way in FIG. 1.

The signal samples from shift registers 25 are sequentially and nondestructively read into one input of multiplier 68 via junction 26. Updated coefficients from coefficient storage 53 are sequentially and nondestructively read into the other input of multiplier 68 via lead 66. The coefficients are stored in shift registers 55, one for each signal sample, so that for the example case there are 50 coefficients. The coefficients are sequentially read into up- or down-counter 57 via lead 60. The error polarity of the equalized digital output from cumulative sum storage 73 is determined by error sensing logic 44 from the equalized digital signal applied via lead 42. The error polarity is one input of Exclusive-OR gate 47 and is applied through lead 45. This input is constant throughout each frame. The other input to gate 47 is the signal polarity which is obtained from the polarity of the most significant digit via lead 37, signal polarity storage 38, and input lead 39. This input may change for each signal sample. The resultant of the modulo-2 addition in gate 47 is available as a control signal on lead 48 and switch 46. If switch 46 is positioned against pole 51, the coefficients are not changed but will remain the same. It is sometimes desirable to have such a "freeze" condition in order to avoid the adverse effects of fortuitous signals that may interfere with the transmission of the data. If switch 46 is in the down position, i.e., making contact with pole 50, then the equalizer is operating in its adaptive mode. The control signal is then applied to up- or down-counter 57 over lead 52 and this control signal will cause the counter to count up or down only one step at a time. With 10 digits, each step represents $\frac{1}{2}^{10}$ or 1/1,024 of the range. This increment is quite small and it would seem desirable to change the increment making it smaller when the error is larger and increasing the increment when the error is small. However, it was found that the increment used, namely 1/1,024, was adequate and consistent with the adaptation time which is one one-hundredth of the prior art devices.

The digital product of the signal samples and the coefficients are applied to adder 71 and to cumulative sum storage 73 over lead 72 where the resulting sum of the 50 samples is obtained. Initially, this output will not be equalized but with the equalizer operating in its adaptive mode, the error sensing logic will determine the error polarity and the resultant will be used to rapidly make correction in the coefficients to achieve an equalized digital output after about 100 signal samples.

This equalized 10-digit signal is applied to a decoder 80 which converts the 10-digit signal into the binary form of the original data signal at the input to the source 10. While the decoded signal is binary and the same as at the input to the source 10, the transmitted signal can be multilevel or correlative and such a signal is accepted by the adaptive equalizer. Hence the adaptive equalizer in FIG. 1 equalizes the signal and also converts it back to its original binary form.

Figure 2B:
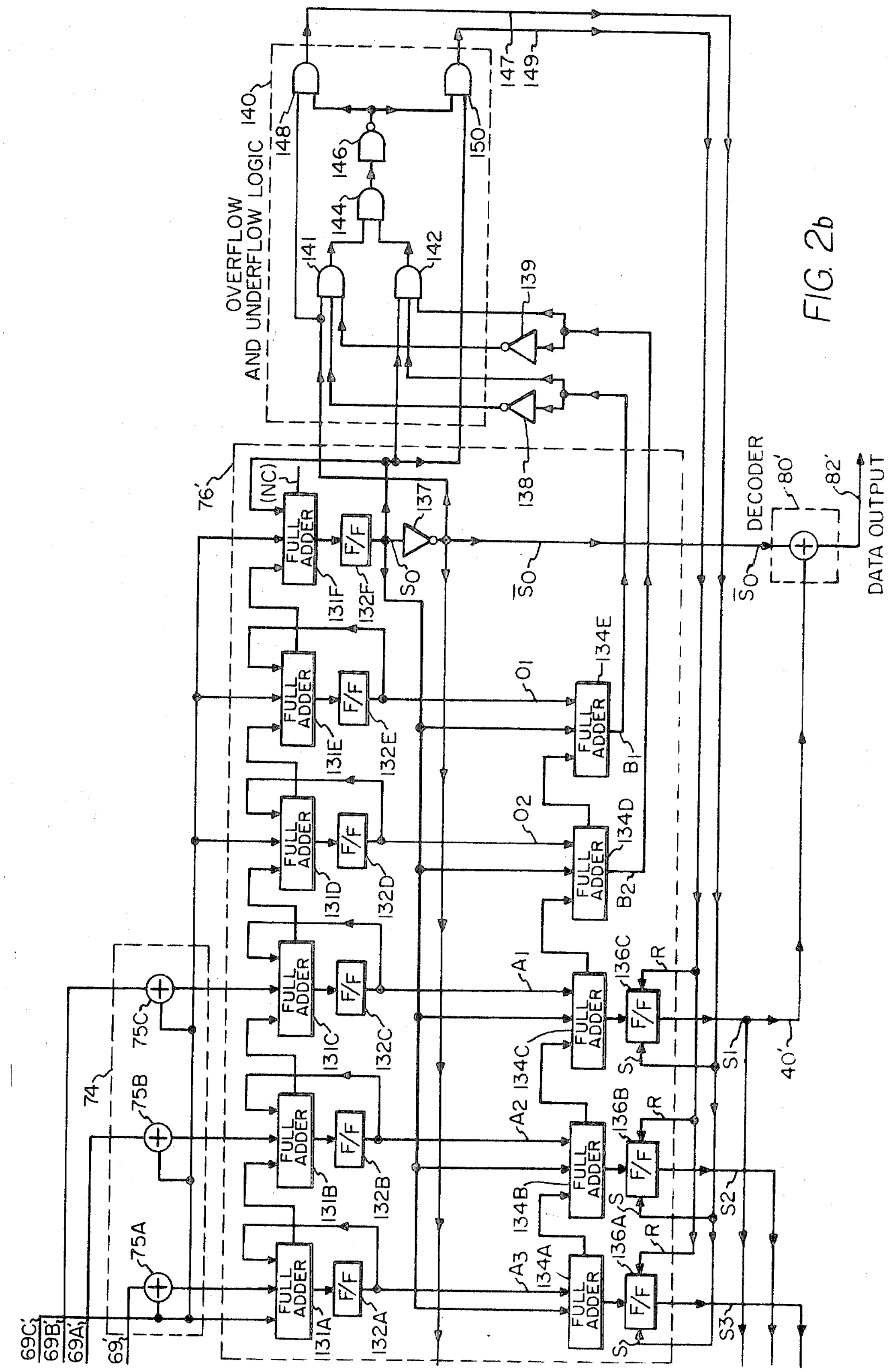
FIGS. 2*a*, 2*b* and 2*c* are detailed block diagrams of a simplified version of one method of implementing the invention.
Figure 2A:
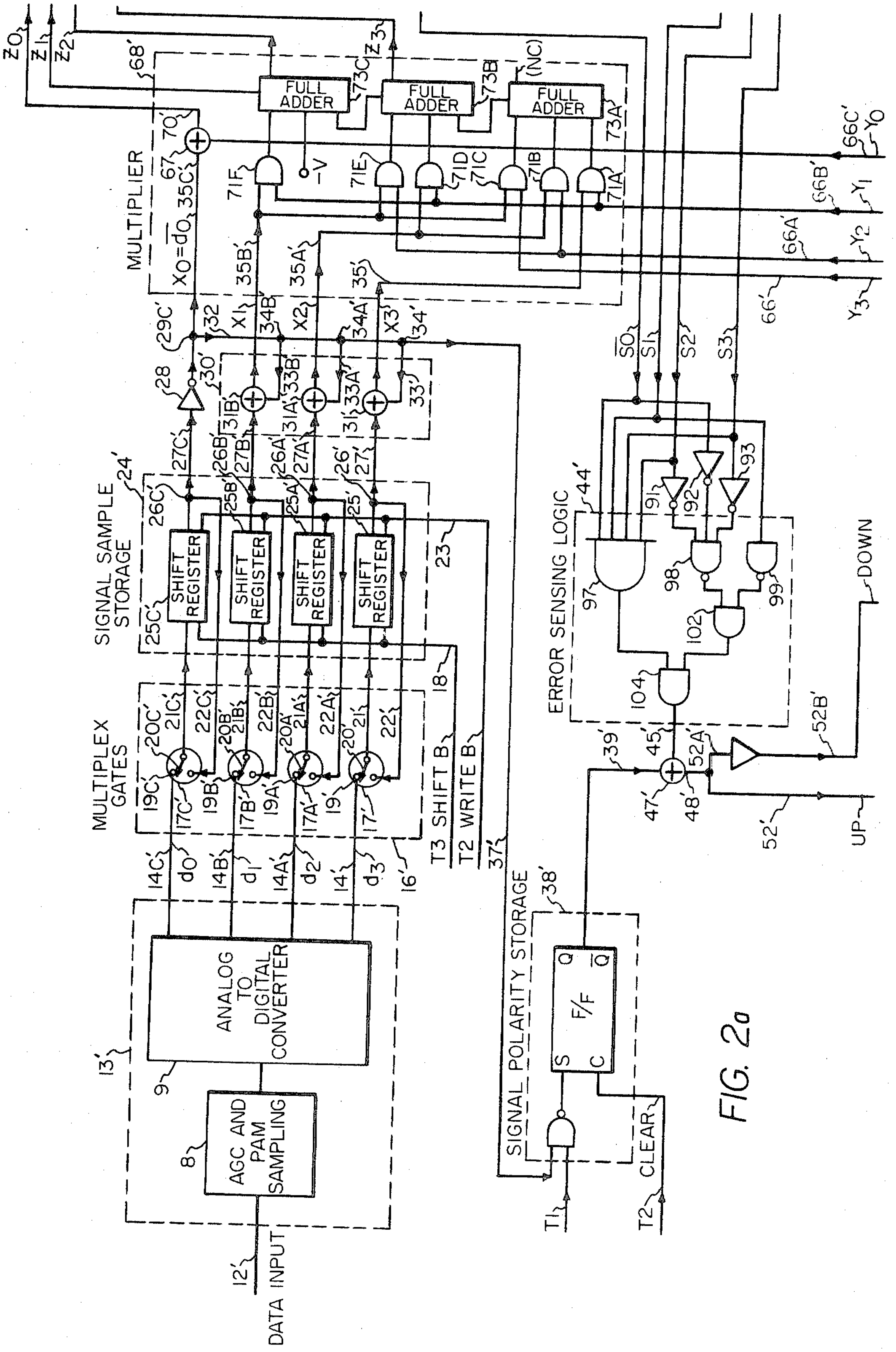
Figure 2C:
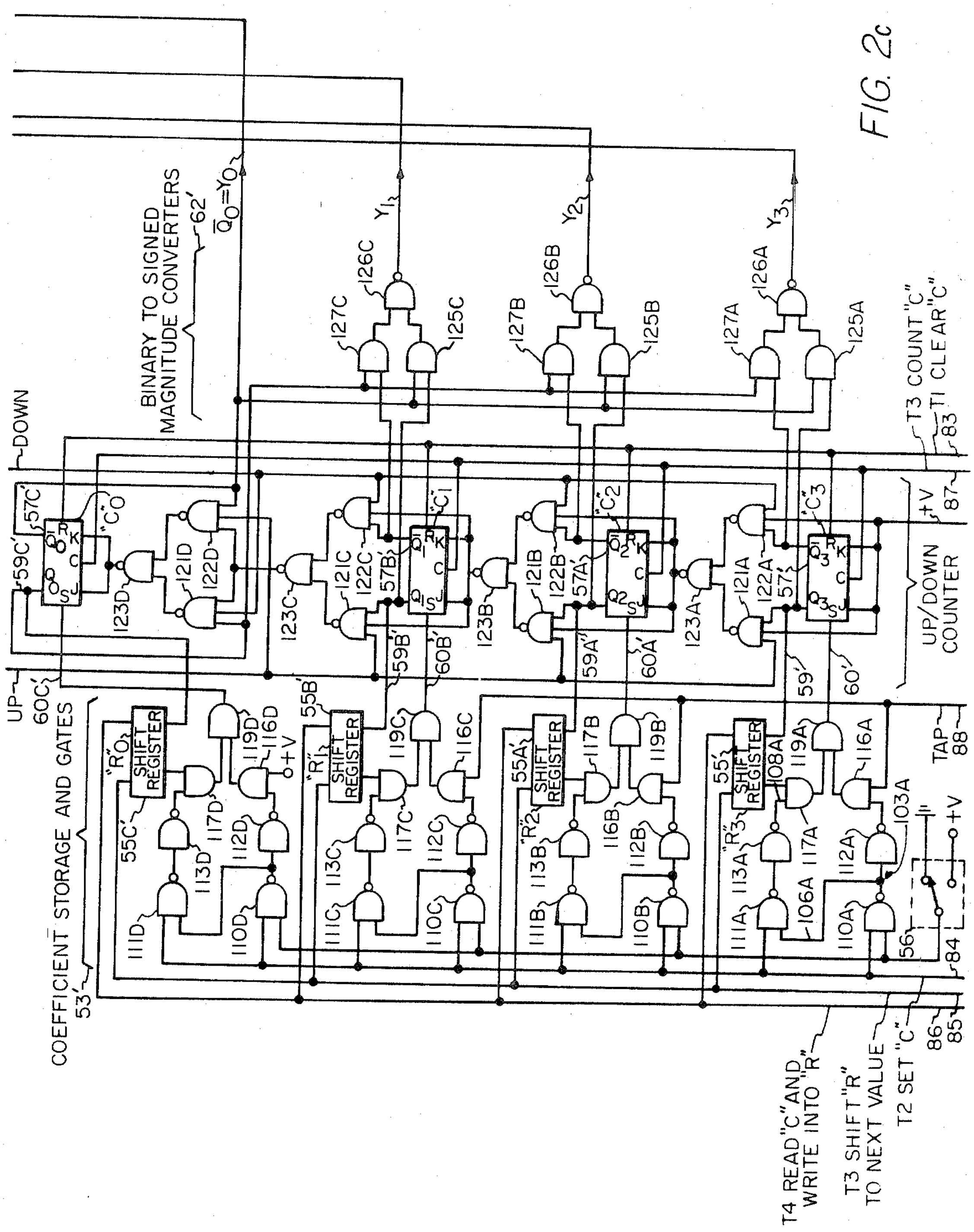

For a clearer understanding of the invention reference may be made to FIG. 2. In this case it is assumed that the data input signal has three levels although any number of levels can be accommodated. Further, only four digits are used in illustrating the digital equalization in order to simplify the drawing and therefore the description, but in the actual system 10 are used. It should be understood that the invention is not limited to three-level signals and that the binary code can be any number $n$ consistent with the accuracy and quantizing noise level requirements. For use with a telephone channel, a binary code with $n = 10$ provided good results. It should be noted that where possible the same base numbers are used to be consistent with similar units illustrated in FIG. 1. They are distinguished by the use of primes. Further, similar units in FIG. 2 use the same base number and are distinguished by using a letter designation, for example, 17′, 17A′, etc., represent the gate for the least significant digit $d_3$ and the gate for digit $d_2$, respectively. These gates, designated by 17, read the output from the A to D converter in parallel at the framing rate into the signal storage shift registers 25′, 25A′, 25B′ and 25C′. Each one of the signal storage shift registers has 50 stages as was the case for the registers illustrated in FIG. 1. It should be recalled that each frame would then contain 51 subframes. It should be remembered that the basic frame time interval is 1/4,800 seconds. This frame is divided into 51 subframes of duration 1/244,800 seconds. Further, each subframe contains four time slots. Each time slot is provided with a clock pulse and the pulses are denoted as $T_1$, $T_2$, $T_3$ and $T_4$. These four pulses occur in every one of the 51 subframes and are used for various operations during the frame period. The 50 signal samples are shifted through the register between frames by clocks $T_2$ and $T_3$ applied to the "write into B," lead 23 and "shift B," lead 18, respectively, of the shift registers. These particular shift registers required two phases of the clock in order to write and shift one bit at a time. New shift registers which are available would require only a single clock pulse to perform both the writing and the shifting.

The signal samples appear sequentially and in parallel on leads 27′, 27A′, 27B′ and 27C′ and are changed from binary to signed magnitude in 30′ for use in multiplier 68′. To do this the most significant digit $d_0$ is inverted in inverter 28 to obtain the polarity digit in signed magnitude form. This polarity digit is then applied to multiplier 68' via lead 35C', to signal polarity storage 38' via junction 29', lead 32 and lead 37', and to one input of each Exclusive-OR gate 31', 31A', and 31B'. The other inputs to these Exclusive-OR gates are the parallel outputs from the signal storage shift registers over leads 27', 27A' and 27B'. The original binary input and the result of the conversion are illustrated in table A.

TABLE A

| Binary | | | | Signed Magnitude | | | |
|---|---|---|---|---|---|---|---|
| $d_0$ | $d_1$ | $d_2$ | $d_3$ | $X_0$ | $X_1$ | $X_2$ | $X_3$ |
| 1 | 1 | 1 | 1 | 0 | 1 | 1 | 1 |
| 1 | 1 | 1 | 0 | 0 | 1 | 1 | 0 |
| 1 | 1 | 0 | 1 | 0 | 1 | 0 | 1 |
| 1 | 1 | 0 | 0 | 0 | 1 | 0 | 0 |
| 1 | 0 | 1 | 1 | 0 | 0 | 1 | 1 |
| 1 | 0 | 1 | 0 | 0 | 0 | 1 | 0 |
| 1 | 0 | 0 | 1 | 0 | 0 | 0 | 1 |
| 1 | 0 | 0 | 0 | 0 | 0 | 0 | 0 |
| 0 | 1 | 1 | 1 | 1 | 0 | 0 | 0 |
| 0 | 1 | 1 | 0 | 1 | 0 | 0 | 1 |
| 0 | 1 | 0 | 1 | 1 | 0 | 1 | 0 |
| 0 | 1 | 0 | 0 | 1 | 0 | 1 | 1 |
| 0 | 0 | 1 | 1 | 1 | 1 | 0 | 0 |
| 0 | 0 | 1 | 0 | 1 | 1 | 0 | 1 |
| 0 | 0 | 0 | 1 | 1 | 1 | 1 | 0 |
| 0 | 0 | 1 | 0 | 1 | 1 | 1 | 1 |

In reviewing the table, it is apparent that a symmetry has been created about the center of the signed magnitude column. The symmetry is more obvious when the most significant digit is not considered, i.e., the left-hand digit of each column. If we assign polarity to this most significant digit than we can have positive and negative numbers which permits operation between +1 and −1 as required for the coefficients. For the logic illustrated, 0 is positive and 1 is negative. The rules for conversion are as follows: (1) invert the polarity digit (most significant digit); (2) do not change the sign of the less significant digits associated with a positive polarity digit; and (3) invert all of the less significant digits associated with a negative polarity digit. As an example, for the binary number 0 1 0 0, the number is negative since the most significant digit will be a 1 after inversion. Therefore, (3) applies and the remaining digits are changed to 0 1 1, giving a result of 1 0 1 1.

The signal samples are identified by the symbol X after having been converted to signed magnitude form and are applied to one input of multiplier 68', via leads 35', 35A', 35B' and 35C'. These samples are to be digitally multiplied by the coefficients identified by the symbol Y that are applied to the multiplier via leads 66', 66A', 66B' and 66C'. The coefficients are also in signed magnitude form. The coefficient generation and correction process will be described later.

Multiplication can be accomplished as a series of additions and this is the way in which multiplication is achieved in multiplier 68'. Multiplication of the signal samples by the coefficients is controlled by the following relationships; (1) for the most significant or polarity digit $X_0 \oplus Y_0 = Z_0$ where $\oplus$ stands for Exclusive-OR addition; (2) for all other digits $$Z_j=\sum_{k=1}^{j-1} X_k Y_{j-k} + \text{all carry digits of } Z_{j+1}$$

and for the present example $Z_1$ = carry, if any, from $Z_2$ $Z_2 = X_1Y_1$ + carry from $Z_3$ $Z_3 = X_1Y_2 + X_2Y_1$ + carry from $Z_4$ $Z_4 = X_1Y_3 + X_2Y_2 + X_3Y_1$ Note that for the third digit, i.e., $Z_3$, to improve the accuracy of $Z_3$ a carry, if any is required from $Z_4$. Further, the number of terms in the equation increases for the less significant digits and the number of terms is equal to $j-1$ where $j$ is the number of the term, that is 1, 2, etc., with the higher number corresponding to the less significant digit.

The multiplication process can be demonstrated by an example where $X$ = 1 1 0 1, $Y$ = 0 1 1 1. It should be noted that the most significant or polarity digits are of opposite signs and it would be expected that the negative sign would prevail which would be the case with modulo-2 addition of either 0 1, or plus and minus, so that the $Z_0$ output on lead 70 as a result of the modulo-2 addition of $X_0$ and $Y_0$ in Exclusive-OR gate 67 is 1, i.e., negative. The remaining digits are multiplied digitally as shown below

```
X1 X2 X3     Y1 Y2 Y3
 1  0  1  ×  1  1  1
---------------------
             1  0  1
          1  0  1
       1  0  1
---------------------
 1  0  0  0  1  1
Z1 Z2 Z3 Z4 Z5 Z6
```

Note that the number of significant figures is doubled. Only the three most significant figures are used, however. This same mathematical result is achieved by the multiplier 68' using only AND gates and three full adders 73A, 73B and 73C. Of course, for 10 binary digits more logic circuitry is required but the logic follows directly from the general mathematical relationship given above. The full adders operate according to the truth table given in table B.

TABLE B.—FULL ADDER TRUTH TABLE

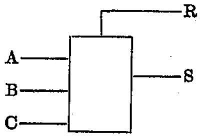

| Input | | | Output | |
|---|---|---|---|---|
| A | B | C | S | R |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

where:

A, B and C are parallel inputs;

S is sum output; and,

R is carry, if any.

The multiplication is achieved by means of parallel additions beginning with the adder associated with the least significant digit. Inputs to AND-gate 71A and $X_3$ $Y_1$; since both are 1's, there is a 1 input to a first input of adder 73A. AND-gate 71B has inputs $X_2$ $Y_2$ which are 0 and 1, respectively, resulting in a 0 input to a second input to adder 73A. The final input to adder 73A is a 1 because the inputs to AND-gate 71C are $X_1$ = 1 and $Y_2$ = 1 which causes a 1 output from AND-gate 71C. The parallel inputs to adder 73A are thus 1 0 1 which, according to the truth table in table B, provides a 0 sum (S) output which is not connected (NC) and a carry (R) for carry of 1 which is applied to the first input of adder 73B. Following the inputs to AND-gate 71D we note that $X_2$ = 0 and $Y_1$ = 1 resulting in a 0 at the second input to adder 73B. In contrast, the inputs to AND-gate 71E are both 1's providing a 1 input to 73B. The inputs to adder 73B are thus 1 0 1 as before. Since the output is $Z_3$, we note that $Z_3$ is equal to 0. Again there is a 1 carry to the first input of adder 73C. A voltage is used, designated V, to show that there is no input (equivalent to "0" binary input) applied to the second input of adder 73C. The inputs to AND-gate 71F are both 1's resulting in a 1 input to adder 73C, and again a parallel input of 1 0 1 to this adder. Thus the output causes $Z_2$ to be equal to 0 and the 1 carry means that $Z_1$ is equal to 1. For the three most significant digits, excluding the polarity digit, we have $Z_1$ = 1, $Z_2$ = 0 and $Z_3$ = 0, which agrees with the result obtained from our previous mathematical multiplication.

The next step is to sum up all 50 results of the multiplication for each signal sample by the corresponding coefficients during each frame. This addition is more readily accomplished with the signal sample products in complement two form. This requires a conversion of the signed magnitude outputs from multiplier 68'. To make the conversion the following rules apply:

1. the most significant digit ($Z_0$) is not changed;
2. invert all magnitude digits for negative values only;
3. add binary 1 to the least significant digit of negative values only.

The result is shown in table C.

TABLE C

| Signed magnitude | Complement two | |
|---|---|---|
| 0 1 1 1 | 0 1 1 1 | |
| 0 1 1 0 | 0 1 1 0 | |
| 0 1 0 1 | 0 1 0 1 | |
| 0 1 0 0 | 0 1 0 0 | Positive range. |
| 0 0 1 1 | 0 0 1 1 | |
| 0 0 1 0 | 0 0 1 0 | |
| 0 0 0 1 | 0 0 0 1 | |
| 0 0 0 0 | 0 0 0 0 | |
| | | Center. |
| 1 0 0 0 | 0 0 0 0 | |
| 1 0 0 1 | 1 1 1 1 | |
| 1 0 1 0 | 1 1 1 0 | |
| 1 0 1 1 | 1 1 0 1 | Negative range. |
| 1 1 0 0 | 1 1 0 0 | |
| 1 1 0 1 | 1 0 1 1 | |
| 1 1 1 0 | 1 0 1 0 | |
| 1 1 1 1 | 1 0 0 1 | |

Note that there are two all-zero positions which cause a loss of two out of $2^{10}$ or 1,024 quantizing levels, but this is not of particular significance when a sufficiently large number of quantizing steps are included as in this case.

Implementation of rule (2) may be achieved by using Exclusive-OR gates 75A, 75B and 75C as shown in converter 74. All digits $Z_1$, $Z_2$ and $Z_3$ will be inverted when $Z_0$ is 1 or negative. The addition of a binary 1 to the least significant place for negative values only is achieved by applying $Z_0$ to one input of the full adder 131A which produces $A_3$. When $Z_0 = 0$ (positive), nothing is added. When $Z_0 = 1$, a binary 1 is added to the least significant place in accordance with rule (3).

It should be recalled that the original data signal was sampled at the framing rate (data rate) and $k$ samples were used to arrive at an equalized data bit during equalization processing. In order to derive an equalized output signal a summation of the $k$ samples for each frame must be made. This is accomplished in accumulator 76', which provides the adders, digit storage and feedback necessary to sum the $k$ signal samples for each frame. In addition to full adders 131A, 131B, 131C and 131F and their associated digit storage flip-flops 132A, 132B, 132C and 132F, respectively, there are two additional adders 131D and 131E and their associated digit storage flip-flops 132D and 132E. Their digit outputs are called overflow digits and they are included because the summation of the $k$ signal samples could cause an apparent shift from one limit to the other of the total range. This could occur even though the actual amplitude would in fact be increasing in the same polarity beyond the limit of that polarity range. For example, if 50 signal sample products are being summed for each digit output of a frame, the 49th could give a result of 1 1 1 for the amplitude portion of the summation. If the 50th input is 0 0 1, the first result would be 1 0 0 0 but the 1 would not be allowed. Thus the apparent result, 0 0 0, would indicate a transition from one extreme to the other.

A significant point to notice is that the overflow stages 131D and 131E have as their inputs the polarity digit $Z_0$ on lead 69C'. This is necessary to facilitate conversion of overflow digits from signed magnitude to complement two form. When $Z_0 = 0$, which indicates a positive polarity, complement two and signed magnitude representations are identical. Hence overflow digits are also binary "0" as provided by the $Z_0$ input which is indeed binary "0." If $Z_0 = 1$, a negative polarity is indicated and conversion from signed magnitude to complement two form calls for the inversion of all digits but the polarity digit. The overflow digits must also be inverted from binary "0" to "1". This is accomplished by providing a $Z_0$ input to the overflow stages 131D and 131E. Now when $Z_0$ is binary "1" the overflow digits are inverted and become binary "1."

An overflow condition is the condition where a positive number is increased beyond its range in the summation process and an underflow condition is the condition where a negative number is increased beyond its range. For a three-level signal, or any other number of levels, the range would normally be considered to be between +1 and −1. An overflow or underflow condition is handled in a unique manner in this system. The maximum amplitude range is extended in the positive and negative directions by adding two overflow stages. Should overflow or underflow occur during the addition process, nothing is being done to limit the addition process and such a condition is accommodated by the additional overflow stages. Hence the addition process during the 50th subframe is linear. When the cumulative summing process is finished in the 51st subframe, the overflow is interpreted and clamped to the maximum permitted value of the positive range. Similarly, underflow is clamped to the minimum permitted value of the negative range.

The polarity digit alone is not a sufficient indicator of underflow or overflow since it retains the same polarity within the range as well as outside the range. However, the polarity digit in conjunction with the overflow digits and the overflow and underflow logic circuitry 140 can be used to sense the condition and to clamp the output. This will be described below.

The accumulator 76' sums the $k$ signal sample products and converts these into a binary representation of the data signal at the framing rate. For an initial condition, assume that the complement two output for the $k-3$ sum is $S_0 = O_1 = O_2 = A_1 = A_2 = A_3 = 0$, and the $k-2$ output from multiplier 68' is $Z_0 = 0$ and magnitude digits $Z_1 = Z_2 = Z_3 = 1$. Since the polarity digit is positive, complement two representation is the same as signed magnitude. Then adding from the least significant digit in full adders 131A–131F and reading the digit sum into digit storage flip-flops 132A–132F we obtain:

| | |
|---|---|
| $A_3=1$ | $O_2=0$ |
| $A_2=1$ | $O_1=0$ |
| $A_1=1$ | $Z_0=0$ |

When written with the most significant digit to the left this is 0 0 0 1 1 1 and is the upper limit of the positive range as shown in table D. Now if we add to this the $(k-1)^{th}$ multiplier output:

| | | |
|---|---|---|
| $Z_0=1$ | $Z_1=1$ | $Z_2=Z_3=0$ |

we are actually subtracting since the polarity digit $Z_0$ is negative. This causes $Z_2$ and $Z_3$ to be changed to 1's and $Z_1$ to 0 in 74. The resultant sum is

| | |
|---|---|
| $A_3=1$ | $O_2=0$ |
| $A_2=1$ | $O_1=0$ |
| $A_3=0$ | $S_0=0$ |

or, 0 0 0 0 1 1, which is still in the positive range but not at the limit. This is the $k-1$ term. For the $k^{th}$ term assume that the output from the multiplier is again $Z_0=0$ and $Z_1 = Z_2 = Z_3 = 1$. Now

| | |
|---|---|
| $A_3=0$ | $O_2=1$ |
| $A_2=1$ | $O_1=0$ |
| $A_1=0$ | $S_0=0$ |

and the sum is 0 0 1 0 1 0 which is beyond the upper limit of the positive range as checked in table D.

For clarity, the above four numbers are shown below:

| Digit No. | Signed Magnitude | Complement Two |
|---|---|---|
| $k-3$ | 0 0 0 0 0 0 | 0 0 0 0 0 0 |

| | | | | | | | | | | | | |
|---|---|---|---|---|---|---|---|---|---|---|---|---|
| $k-2$ | 0 | 0 | 0 | 1 | 1 | 1 | 0 | 0 | 0 | 1 | 1 | 1 |
| $k-1$ | 1 | 0 | 0 | 1 | 0 | 0 | 1 | 1 | 1 | 1 | 0 | 0 |
| $k$ | 0 | 0 | 0 | 1 | 1 | 1 | 0 | 0 | 0 | 1 | 1 | 1 |

The sum of the last four in complement two form is easily checked by following the rules of addition of binary numbers and is 0 0 1 0 1 0 as before.

After the $k$ summations the resulting sum is converted to binary form from the complement two form. This conversion requires the inversion of the most significant digit, polarity digit $S_0$, and the subtraction of a binary "1" from the magnitude of the number only if $S_0 = 1$, i.e., is negative, before inversion. Instead of subtracting it is simpler to add complement two at 0 0 0 0 1, which is 1 1 1 1 1.

Example: $S_0\ O_1\ O_2\ A_1\ A_2\ A_3$

Complement two form 1 1 1 0 0 0

(1) Invert $S_0$ $S_0=0$;

(2) Add 1 1 1 1 1 to remaining digits

```
 1 1 0 0 0
 1 1 1 1 1
 ---------
 1 0 1 1 1
```

disregarding final carry; and (3) Result 0 1 0 1 1 1

The complement two form and corresponding binary form are shown in table D below. On the table, the positive and negative ranges are indicated and the overflow and underflow regions are shown.

The conversion can be accomplished as shown in FIG. 2 where the polarity digit $S_0$ is connected to one input of each full binary conversion adder 134A–134E to satisfy the requirement for addition of a 1 to each digit where $S_0 = 1$ prior to inversion and $S_0$ is inverted in inverter 137.

Since our $k^{th}$ term was 0 0 1 0 1 0 this is the term that would be applied to the binary conversion adders. The adders 131 sum the $k$ signal sample products and store these in flip-flops 132. Conversion and readout is only done at the frame rate. The output in binary form is $S_3=0$ $B_2=1$
$S_2=1$ $B_1=0$
$S_1=0$ $\overline{S_0}=1$ 1 0 1 0 1 0

TABLE D.—Complement Two to Binary Conversion

| $S_0O_1O_2A_1A_2A_3$ Positive | | $S_0B_1B_2S_1S_2S_3$ Binary | $S_0O_1O_2A_1A_2A_3$ Negative | | $\overline{S_0}B_1B_2S_1S_2S_3$ Binary |
|---|---|---|---|---|---|
| 0 1 1 1 1 1 | | 1 1 1 1 1 1 | 1 1 1 1 1 1 | Negative | 0 1 1 1 1 0 |
| 0 1 1 1 1 0 | | 1 1 1 1 1 0 | 1 1 1 1 1 0 | | 0 1 1 1 0 1 |
| 0 1 1 1 0 1 | | 1 1 1 1 0 1 | 1 1 1 1 0 1 | | 0 1 1 1 0 0 |
| 0 1 1 1 0 0 | | 1 1 1 1 0 0 | 1 1 1 1 0 0 | | 0 1 1 0 1 1 |
| 0 1 1 0 1 1 | | 1 1 1 0 1 1 | 1 1 1 0 1 1 | | 0 1 1 0 1 0 |
| 0 1 1 0 1 0 | | 1 1 1 0 1 0 | 1 1 1 0 1 0 | | 0 1 1 0 0 1 |
| 0 1 1 0 0 1 | | 1 1 1 0 0 1 | 1 1 1 0 0 1 | | 0 1 1 0 0 0 |
| 0 1 1 0 0 0 | | 1 1 1 0 0 0 | | | |
| 0 1 0 1 1 1 | Overflow | 1 1 0 1 1 1 | 1 1 1 0 0 0 | Underflow | 0 1 0 1 1 1 |
| 0 1 0 1 1 0 | | 1 1 0 1 1 0 | 1 1 0 1 1 1 | | 0 1 0 1 1 0 |
| 0 1 0 1 0 1 | | 1 1 0 1 0 1 | 1 1 0 1 1 0 | | 0 1 0 1 0 1 |
| 0 1 0 1 0 0 | | 1 1 0 1 0 0 | 1 1 0 1 0 1 | | 0 1 0 1 0 0 |
| 0 1 0 0 1 1 | | 1 1 0 0 1 1 | 1 1 0 1 0 0 | | 0 1 0 0 1 1 |
| 0 1 0 0 1 0 | | 1 1 0 0 1 0 | 1 1 0 0 1 1 | | 0 1 0 0 1 0 |
| 0 1 0 0 0 1 | | 1 1 0 0 0 1 | 1 1 0 0 1 0 | | 0 1 0 0 0 1 |
| 0 1 0 0 0 0 | | 1 1 0 0 0 0 | 1 1 0 0 0 1 | | 0 1 0 0 0 0 |
| 0 0 1 1 1 1 | | 1 0 1 1 1 1 | 1 1 0 0 0 0 | | 0 0 1 1 1 1 |
| 0 0 1 1 1 0 | | 1 0 1 1 1 0 | 1 0 1 1 1 1 | | 0 0 1 1 1 0 |
| 0 0 1 1 0 1 | | 1 0 1 1 0 1 | 1 0 1 1 1 0 | | 0 0 1 1 0 1 |
| 0 0 1 1 0 0 | | 1 0 1 1 0 0 | 1 0 1 1 0 1 | | 0 0 1 1 0 0 |
| 0 0 1 0 1 1 | | 1 0 1 0 1 1 | 1 0 1 1 0 0 | | 0 0 1 0 1 1 |
| 0 0 1 0 1 0 | | 1 0 1 0 1 0 | 1 0 1 0 1 1 | | 0 0 1 0 1 0 |
| 0 0 1 0 0 1 | | 1 0 1 0 0 1 | 1 0 1 0 1 0 | | 0 0 1 0 0 1 |
| 0 0 1 0 0 0 | | 1 0 1 0 0 0 | 1 0 1 0 0 1 | | 0 0 1 0 0 0 |
| 0 0 0 1 1 1 | Positive | 1 0 0 1 1 1 | 1 0 1 0 0 0 | | 0 0 0 1 1 1 |
| 0 0 0 1 1 0 | | 1 0 0 1 1 0 | 1 0 0 1 1 1 | | 0 0 0 1 1 0 |
| 0 0 0 1 0 1 | | 1 0 0 1 0 1 | 1 0 0 1 1 0 | | 0 0 0 1 0 1 |
| 0 0 0 1 0 0 | | 1 0 0 1 0 0 | 1 0 0 1 0 1 | | 0 0 0 1 0 0 |
| 0 0 0 0 1 1 | | 1 0 0 0 1 1 | 1 0 0 1 0 0 | | 0 0 0 0 1 1 |
| 0 0 0 0 1 0 | | 1 0 0 0 1 0 | 1 0 0 0 1 1 | | 0 0 0 0 1 0 |
| 0 0 0 0 0 1 | | 1 0 0 0 0 1 | 1 0 0 0 1 0 | | 0 0 0 0 0 1 |
| 0 0 0 0 0 0 | | 1 0 0 0 0 0 | 1 0 0 0 0 1 | | 0 0 0 0 0 0 |

Overflow and underflow summing logic is derived as follows. Referring again to table D, it is to be noted that the polarity digit is either 1 or 0 for all positive or negative values. Further, the overflow digits are of the same sign as the polarity digit before inversion within the limits of the positive or negative ranges but these relationships do not hold outside of these ranges. These relations may be expressed by the following logic using binary form in table D.

Positive range $= H = \overline{S_0}\,\overline{B_1}\,\overline{B_2}$; and,
Negative Range $= L = S_0 B_1 B_2$ or
$\underline{L} = \overline{\overline{S_0}} B_1 B_2$
where $\overline{\overline{S_0}} = S_0$ One form of implementation of this logic is shown at 140, FIG. 2. AND-gate 141 is for the positive range so that the inputs are $\overline{S_0}$ from the output of the inverter 137, $\overline{B_1}$ from the output of inverter 138 and $\overline{B_2}$ from the output of inverter 139. AND-gate 142 is for the negative logic and has inputs directly from $S_0$, $B_1$ and $B_2$. So long as the sum is within the range, one of these two gates will have an output. This output goes to OR-gate 144 and NAND-gate 146. With an input to NAND-gate 146, there will be no output if the number is within range. However, when there is no output from gate 144 into the input of gate 146, this indicates that an overflow or an underflow condition has occurred. If so, then NAND-gate 146 will have an output. The next step is to determine whether an overflow or an underflow condition has occurred. To this end, gate 148 indicates overflow since it responds when its input $\overline{S_0} = 1$. Similarly, gate 150 indicates underflow and it has an output when $\overline{S_0} = 0$. This is in accordance with table D.

Referring again to the $k^{th}$ digit sum which was 0 0 1 0 1 0, an overflow is indicated. Hence this digit sum should be changed to 0 0 0 1 1 1 in complement two form or 1 0 0 1 1 1 in binary form which is the maximum permissible positive value. Actually only the most significant and last three digits are important for error summing and decoding since the other digits are merely overflow digits and are used only in overflow line 140. The overflow and underflow logic and flip-flops 136A, 136B and 136C are used together to correct the binary output when overflow or underflow is indicated. Using the first three magnitude digits 0 0 1, neither AND-gate 141 nor AND-gate 142 will have the necessary inputs to produce an output since the signal is not within range. Thus there is no input to NAND-gate 146 and this results in an output from this gate. At the same time, $\overline{S_0} = 1$ is applied to AND-gate 148 which, in conjunction with the input from NAND-gate 146, causes AND-gate 148 to have an output thus indicating overflow. This output is applied over lead 147 to the S, set, input of each flip-flop 136A, 136B and 136C setting each to binary "1." Thus, the correct maximum magnitude is obtained. A similar but opposite result is obtained when the $k^{th}$ binary term is beyond the negative amplitude range. For example, assume that the $k^{th}$ term in binary form is 0 1 0 0 0 1. This code appears in the binary column of table D. The input to AND-gate 141 is 0 0 1 so it has no output. Similarly, for AND-gate 142 the input is 1 1 0 and again there is no output. OR-gate 144 has no inputs, hence no output is applied to the input of NAND-gate 146. But this causes 146 to have an output. Since there is also an input, $\overline{\overline{S}_0}=1$ or $S_0=1$, into AND-gate 150, this gate has an output indicating an underflow condition. This output is applied over lead 149 to the R, reset, lead of each of the flip-flops 136A, 136B and 136C causing each one to reset to binary 0. Thus, the amplitude is clamped to the lower limit of the range in accordance with table D.

The actual digital output in binary form $\overline{S}_0$ $S_1$ $S_2$ $S_3$ obtained from accumulator 76' no longer exhibits overflow or underflow conditions but simply increases from 0 to a positive or negative maximum within a predetermined range, which in this case is determined by four digits. This was evident in table D for binary columns but becomes more obvious in the table E, which is similar to the binary columns in table D, but without overflow or underflow digits $B_1$ and $B_2$.

TABLE E

| Amplitude | $S_0$ | $S_1$ | $S_2$ | $S_3$ | |
|---|---|---|---|---|---|
| | Overflow | | | | |
| 2 | 1 | 1 | 1 | 1 | $+\epsilon$ |
| | 1 | 1 | 1 | 0 | $-\epsilon$ |
| | 1 | 1 | 0 | 1 | $-\epsilon$ |
| | 1 | 1 | 0 | 0 | $-\epsilon$ |
| | Slicing level. | | | | |
| | 1 | 0 | 1 | 1 | $+\epsilon$ |
| | 1 | 0 | 1 | 0 | $+\epsilon$ |
| | 1 | 0 | 0 | 1 | $+\epsilon$ |
| | 1 | 0 | 0 | 0 | $+\epsilon$ |
| 1 | | | | | |
| | 0 | 1 | 1 | 1 | $-\epsilon$ |
| | 0 | 1 | 1 | 0 | $-\epsilon$ |
| | 0 | 1 | 0 | 1 | $-\epsilon$ |
| | 0 | 1 | 0 | 0 | $-\epsilon$ |
| | Slicing level. | | | | |
| | 0 | 0 | 1 | 1 | $-\epsilon$ |
| | 0 | 0 | 1 | 0 | $-\epsilon$ |
| | 0 | 0 | 0 | 1 | $-\epsilon$ |
| 0 | 0 | 0 | 0 | 0 | $-\epsilon$ |
| | Underflow | | | | |

In addition to the four-digit binary code in the range allowed, table E shows the slicing levels and the desired amplitude levels for a three-level signal. These are consecutively marked from 0 to 2. Errors in level occur for those binary codes above or below the desired amplitude level. To make the error sensing logic more sensitive the extreme upper level is considered to have a positive error $+\epsilon$ and the extreme lower level is assumed as a negative error $-\epsilon$. This is a unique feature.

It is apparent from the table that the amplitude of the binary data signal can be determined from the two most significant digits $S_0$ and $S_1$ by using an Exclusive-OR gate. The two extreme levels will then be 0 and the center level will be 1. This is true in this particular case, since the signal described is modified duobinary with three levels as described for example in U.S. Pat. No. 3,457,510. Here the three levels, 0, 1, 2 are interpreted modulo-2 so that the center level is interpreted as binary 1 and the bottom and top levels 0 and 2 respectively, as binary 0. If so, then the zone for binary zero in table E is between the two slicing levels or wherever $S_0$ and $S_1$ are not the same. Otherwise it is a binary one. Hence the decoding for this particular case is $S_0 \oplus S_1$. However, in a general case such as multilevel, for example, all levels are distinct as are 0 and 2 levels, and each level must be decoded individually. In such a case the decoding logic is also determined from table E, but the logic is different. In this case $S_0$ and $S_1$ still can be used as follows: if they are different the level is 1; if both are 0 0, the level is 0; and if both are 1 1, the level is top or 2. Should the system have two levels or more than three levels, the decoding logic is determined in a similar manner from table E. It should be remembered that the practical, implemented system employs 10 digits rather than four as in table E so that a signal with a large number of levels can easily be interpreted.

The error sensing logic circuitry 44' determines the error polarity for the duration of the subsequent frame and multiplies it by the polarity of the signal samples to correct the coefficients and eventually to equalize the signal. The error polarity for any three-level signal described here and determined from table E follows:

$$+\epsilon=\overline{S_0}S_1S_2S_3+\overline{S_1}[\overline{S_0\overline{S_2S_3}}]$$

or $$-\epsilon=S_0\overline{S_1S_2S_3}+S_1[\overline{\overline{S_0}S_2S_3}]$$

where $S_0$ is inverse or complement of $\overline{S_0}$. One means of implementing the logic for $+\epsilon$ is shown in FIG. 2 where error sensing logic 44' and NAND-gates 91, 92 and 93 are used. The above error sensing logic statement as obtained from table E can be expressed in words for $+\epsilon$(or similarly for $-\epsilon$) as follows. A positive error occurs when either all digits are binary 1 or digit $S_1$ is binary 0 provided not all other digits are binary 0 at the same time. Negative error occurs when positive error is absent. Error sensing logic does not depend upon the type of signal, correlative, multilevel or any other. It is strictly related to the number of signal and slicing levels as illustrated in table E. For two levels or more than three levels the error sensing logic is determined in a similar manner from table E by dividing the peak-to-peak range into zones between the signal (solid lines) and slicing (dashed lines) levels. These zones must alternate between positive error $+\epsilon$ and negative error $-\epsilon$. The only exception is the top and bottom levels where the top may result from overflow and is $+\epsilon$, while the bottom may result from underflow and is $-\epsilon$.

Take, for example, error output of 1 0 1 0 that represents $\overline{S_0}$ $S_1$ $S_2$ $S_3$. From table E this falls in the $+\epsilon$ region above the level number 1 and below the slicing level. The amplitude is closest to level number 1 but larger than level 1. When applied to the error sensing logic which is designed for $+\epsilon$, AND-gate 97 has inputs of 1 0 1 0 and therefore provides no output. The inputs $\overline{S}_0$, $S_2$ and $S_3$ are 1 1 0 and each of these is inverted in NAND-gates 91, 92 and 93 providing a 0 0 1 input to NAND-gate 98. NAND-gate 98 provides an output and it is applied as one input to AND-gate 102. The digit $S_1$ is 0 and is applied to another input of AND-gate 102. The output of AND-gate 102 is therefore binary 1 and so is the output of OR-gate 104 indicating $+\epsilon$ or positive error. Had it been a negative error, the output of 104 would be binary 0. But in this case OR-gate 104 is a binary 1 via lead 45' to Exclusive-OR gate 47' during the entire subsequent frame indicating a positive error.

When the accumulator 76' output is $\overline{S}_0=0$, $S_1=1$, $S_2=0$, and $S_3=1$ or 0 1 0 1 the error is negative according to table E. In this case, AND-gate 97 in the error sensing logic 44' has no output. NAND-gate 98 has output 1 but 99 has no output or is a binary 0. Hence, AND-gate 102 has no output and therefore has no output or binary 0 output indicating negative error. This is applied through lead 45' to Exclusive-OR gate 47'. This zero output is applied during the entire subsequent frame and multiplies the polarity digit of each of the signal samples applied via signal polarity storage 38 and lead 39 to Exclusive-OR gate 47'. It can be seen that when the product of the error and signal sample at the output of Exclusive-OR gate on lead 48' is positive, the value of the coefficient should be decreased; and when the product is negative the value of the coefficient should be increased.

The coefficients must be changed to make the required correction. The coefficients are in digital form and are stored in shift registers 55', 55A', 55B' and 55C'. There is one set of coefficients for every signal sample so that these shift registers also have $k$ stages. There is also a storage flip-flop associated with each coefficient shift register stage. These storage flip-flops 57', 57A', 57B' and 57C' comprise a four-stage binary counter in this example. The implemented practical system has 10 shift registers and a 10-stage binary counter. Any number, of course, is possible. One bit at a time is shifted from the output of each of the shift registers into a corresponding binary stage of the counter. Subscript "0" on C or Q of the counter indicates most significant digit and subscript "3" the least. Next, the counter is advanced or retarded. Finally, the corrected value of the counter is transferred to the input of the shift register and at the same time all counters are cleared to zero. This operation is performed $k$ times during the framing period. Counters are advanced or retarded depending on the input from the Exclusive-OR gate 47' which performs the multiplication of the error and signal polarities as shown in FIG. 2. When the input is positive, i.e., equal to 0, the counter is retarded or counted down. If it is negative, then the counter is counted up.

A set of multiplex gates having base numbers 110, 111, 112, 113, 116, 117 and 119, is associated with each shift register. The operation of these multiplex gates depends on switch 56. When this switch is connected to ground, the system is in the adaptive mode and the coefficients are transferred from the shift registers to the flip-flops. On the other hand, when the switch is disconnected from ground and connected to voltage +V the system is in the nonadaptive mode and all coefficients are set to 0 except for the center tap. This tap is set to unity by a voltage shown as TAP on lead 88. This is actually a steady negative voltage level during which coefficients are set to 0 except that during the center subframe the voltage is positive thus permitting the setting of the coefficient of the main tap to unity.

In the adaptive mode a clock pulse $T_1$ on lead 83 first clears the fliptflops of the counter to zero. The multiplex gates associated with each shift register operate in a similar manner and only the operation of the multiplex gate associated with shift register 55' is explained in detail. The mode switch 56 is connected to ground so that one input of NAND-gate 110A is at ground. When the set "C" clock pulse $T_2$ is applied on lead 84, this pulse is applied to both NAND-gates 110A and 111A. There is an output from NAND-gate 110A which is applied to NAND-gate 111A via lead 106A and to NAND-gate 112A via lead 103A. The latter prevents the output from NAND-gate 112A which in turn prohibits operation of AND-gate 116A. The other input to 116A is the tap voltage on lead 88 which, in the nonadaptive mode, causes each coefficient to be zero except for that one corresponding to the center tap which is made equal to 1. For the adaptive mode, however, the NAND-gate 111A receives an input from both clock pulse $T_2$ and from NAND-gate 110A and, hence, has no output. This enables NAND-gate 113A causing an input to be applied to AND-gate 117A via lead 108A. Thus 117A is ready to transfer the present coefficient from shift register 55' to counter stage 57' under control of clock pulse $T_3$ on lead 85 which shifts the shift register to read the bit out of the register and to discard the old value. The bit passes through OR-gate 119A and appears on lead 60' which interconnects the output of OR-gate 119A and the S (set) terminal of shift register 57'. If the present coefficient is 1 1 1 0, then the first three most significant digits would be 1 inputs to the set, S, input causing $Q_0 = Q_1 = Q_2 = 1$ and $\overline{Q_0} = \overline{Q_1} = \overline{Q_2} = 0$. For the least significant digit the 0 input to the set lead would not change the state of the flip-flop since it was cleared to 0 and, therefore, $Q_3 = 0$ and $\overline{Q_3} = 1$.

Next, the coefficient is up-dated by a control pulse on the up or down leads 52' or 52B', respectively. Assume first that an up-count occurs. The clock pulse $T_3$ on lead 87 is connected to control leads C of the flip-flops and when the timing pulse is present will cause the following to occur. The least significant digit will change state. This occurs each time a clock pulse $T_3$ occurs because of the +V voltage applied to the J and K inputs. The up-count is applied to one input of NAND-gate 121A and the +V is applied to a second input while the $Q_3$ output is applied to the third input. $Q_3 = 0$ thus giving a 110 input to 121A and therefore NAND-gate 121A is enabled applying an input to one input of NAND-gate 123A. The other input to NAND-gate 123A comes from the output of NAND-gate 122A which has $\overline{Q_3} = 1$ as one input, +V as a second input and the down-count as the third input. Since these are not all 1's there is an output which means that there are two inputs to NAND-gate 123A and this gate has no output. Thus, when the count pulse $T_3$ is applied, flip-flop 57A' does not change state. By similar analysis neither 57B' nor 57C' change state so the up-dated coefficient is 1 1 1 1.

If a down count occurs, the following operations take place. Flip-flop 57' changes state as noted above for each clock pulse count $T_3$. However, prior to this change the inputs to NAND-gates 122A are all 1's which means that the gate has no output. Since the 121A gate has inputs of 0 1 0 it has an output and the 1 0 input to NAND-gate 123A enables this gate causing an output. Thus, when the clock pulse $T_3$ occurs, flip-flop 57A' changes state. Neither flip-flop 57B' nor 57C' change state because their C lead input from gates 123C' and 123D' are the same as for the up-count. For example, NAND-gate 121B has inputs of (1) up-count = 0; (2) NAND-gate 123A output = 1; and (3) $Q_2$ output = 1; thereby enabling NAND-gate 121B. NAND-gate 122B has inputs of (1) $\overline{Q_2} = 0$; (2) 123A output = 1; and (3) down-count = 1, thereby enabling NAND-gate 122B. Since there are 1's on both inputs of NAND-gate 123B, the gate has a 0 output which causes the flip-flop to retain its state during the $T_3$ count clock pulse. As a result, the coefficient becomes 1 1 0 1 which is the correct value for a down-count from the original coefficient 1 1 1 0.

A unique feature is the method for overflow or underflow at the counter. Provisions are made for the counter to return to its center value as soon as either one or the other extreme value is reached–overflow or underflow.

The gates between stages of the counter provide the logic to prevent overflow or underflow from shifting the counter output from one extreme position to the other. Overflow takes place when an all 1 state is reached and an up count occurs. The normal binary addition would change all digits to 0 which is the bottom or opposite extreme position. However, the counter logic is designed to change the $C_1$ to $C_3$ digits to 0 but to leave the most significant digit as a 1 thus assuring return to the center position. NAND-gate 121A will not have an output because each of its three inputs is a 1, however, NAND-gate 122A is enabled because only its +V input is a 1. The 10 input to NAND-gate 123A causes a 1 output to be applied to the JK inputs of flip-flop 57A' and this flip-flop will change state when clock pulse $T_3$ is applied to its control connection C. In a similar manner 57B' will also change state. However, 57C' will not change state. First note that the output of NAND-gate 123C is not applied to the JK inputs of 57C', but rather to an additional set of gates. Further, this additional set of gates is connected to the up and down inputs in the opposite way from the preceding similar gates. The up-count lead is connected to 122D and the down-count lead is connected to 121D. Further, one input to 121D is $Q_0$ and one input to 122D is $\overline{Q_0}$. The third input to NAND-gate 121D and 122D is the output from NAND-gate 123C. Thus the input to NAND-gate 121D is 1 0 1 causing it to be enabled and to supply a 1 input to NAND-gate 123D. Similar inputs are applied to NAND-gate 122D. Thus NAND-gate 123D has a 1 1 input and provides a 0 output to J and K connections on flip-flop 57C'. The overflow causes the counter to shift from an extreme level to a center level 1 0 0 0. In a similar manner, when the coefficient is at the lower extreme level 0 0 0 0 and a down count occurs, then the underflow logic causes the counter states to change to 0 1 1 1 which is also a desired center state.

Clock Pulse $T_4$ on lead 86 follows pulse $T_3$ and transfers the up-dated coefficient value from the storage flip-flop back into the input of the shift registers via leads 59', 59A', 59B', and 59C'. At the same time it is read also into the binary to signed magnitude converter 62'. In converting the coefficients from binary to signed magnitude form the rules apply that (1) invert the most significant digit, and (2) invert all other digits only if the most significant digit was 0 before inversion, otherwise not. This is accomplished by using $\overline{Q_0}$ as being equal to $Y_0$ which accomplishes the inversion of the most significant digit. Take the up-dated coefficient to be 1 1 1 0 then $Q_0 = 1$ and $\overline{Q_0} = 0$ so that $Y_0 = 0$. Since the most significant digit was 1 prior to inversion, none of the remaining digits should be changed. The least significant digit $Q_3 = 0$ and $\overline{Q_3} = 1$ outputs from flip-flop 57' are applied, respectively, as one input each to AND-gates 125A and 127A. The other input to 125A is $\overline{Q_0} = 0$ so that the gate has no output. AND-gate 127A has 1 inputs from both $\overline{Q_3} = 1$ and $Q_0 = 1$ and, therefore, applies an output to one input of NOR-gate 126A which causes the output of 126A to be 0.

For the gates associated with $Q_2$, we have a 1 0 input to 125B from $Q_2=1$ and $\overline{Q_0}=0$, respectively, and the gate has a 0 output. The inputs to NAND-gate 127B are also 1 0 from $Q_0 = 1$ and $\overline{Q_2}=0$, respectively, and this gate has a 0 output. For 0 0 inputs, NOR-gate 126B has a 1 output. Similarly, NOR-gate 126C has a 1 output. So the signed magnitude representation of 1 1 1 0 is 0 1 1 0 which is in agreement with the rules set forth above.

The up-dated coefficients in signed magnitude form are designated $Y_0$, $Y_1$, $Y_2$ and $Y_3$ and are applied to multiplier 68' via leads 66', 66A', 66B' and 66C', respectively.

The coefficients are continuously up-dated on a decision-directed basis that is in the presence of random data, but not from any predetermined pattern as long as the switch 56 is in the adaptive mode.

While the invention and embodiments thereof have been described in detail, it will be obvious to those skilled in the art that the invention may be embodied otherwise without departing from its spirit and scope.

What is claimed is:

1. A decision-directed digital adaptive equalizer for a transmission channel of limited bandwidth comprising:
   - means for sampling a data message signal having a binary data transmission rate, said signal samples being taken at time intervals determined by the data transmission rate, and for converting each said signal sample into a binary code having $n$ digits per signal sample;
   - means for storing $k$ said binary coded signals, each set of $k$ said coded signals comprising a frame, said storing means accepting outputs from said first mentioned means at time intervals determined by said data rate;
   - means for deriving an equalized binary coded signal;
   - means controlled by the equalized binary coded signal for detecting amplitude errors in the equalized signal, said detecting means providing positive or negative error indications;
   - means for deriving coefficients in binary form, said deriving means having $n$ stages, and cooperating with said detecting means to correct said coefficients according to said error indications;
   - coefficient storing means having $k$ storage elements, one corresponding to each of said binary coded signal samples, said coefficient storage cooperating with said deriving means to store the $k$ coefficients corrected during each frame;
   - means for sequentially combining said binary coded signal samples with their corresponding corrected binary coefficients during each frame;
   - means for summing the produce of the $k$ binary coded signal samples and the respective $k$ coefficients to obtain said equalized binary coded signal; and
   - means for decoding the equalized binary coded signal samples to obtain an equalized data message signal.

2. The adaptive equalizer of claim 1 in which the data message signal is binary.

3. The adaptive equalizer of claim 1 in which the data message signal is multilevel in form.

4. The adaptive equalizer of claim 1 in which the data message signal is correlative.

5. A decision-directed adaptive equalizer for a band-limited transmission channel comprising:
   - means for converting a data message signal into a binary code having $n$ digits;
   - means for storing $k$ binary coded signals, each set of $k$ binary coded signals comprising a frame said storing means having an input and an output;
   - means for gating said binary coded signals from said converting means into the input of said storing means;
   - timing means for sequentially reading the $k$ binary coded signals into the output of said storing means;
   - polarity determining means connected to the output of said storing means for determining the polarity of each binary coded signal sample, said polarity means having an input and an output;
   - means for storing the polarity of the signal sample, said polarity storing means having an input connected to an output of said polarity determining means and an output;
   - error sensing means having inputs from $n$ equalized binary code samples, each said binary code sample representing a summation of $k$ samples, and an output, said output being of one binary state for a positive error and of the other binary state for a negative error;
   - combining means for combining the outputs from the polarity storage means and said error sensing means, said combining means having an output of one binary state when said binary error and polarity outputs are of like condition and the other binary state when they are of unlike condition;
   - means for storing values $k$ of digits coefficients in digital form, each coefficient comprising $n$ digits;
   - counting means having two outputs and two inputs, one said input being connected to an output of said coefficient storing means so that each of said coefficients may be sequentially read into said counting means and the second input being connected to the output of said combining means, said counting means counting up when the indication from said combining means is in said one binary state and counting down for said other binary state for correction of the $n$ digit representation of the coefficient for each of the coefficients during each frame, one output being connected to the input of said coefficient storing means for storing the updated coefficient;
   - multiplying means having two inputs and one output with each input capable of accepting an $n$ digit binary code one said input being connected to the output of said storing means and the other said input being connected to the other output of said counting means, said multiplying means digitally multiplying the $k$ binary coded signal samples by the $k$ coefficients to obtain $k$ up-dated signal samples;
   - summing means, connected to the output of said multiplying means, to sum the $k$ signal samples to obtain an equalized $n$ digit signal; and
   - means for decoding the equalized signal sample so that an equalized data message signal is obtained.

6. A transversal filter for equalizing amplitude and phase distortion of a transmission channel comprising:
   - means for quantizing and binary coding a signal received from said channel;
   - means for storing $k$ said binary coded signals;
   - means for deriving $k$ coefficients in binary form one corresponding to each one of said $k$ binary coded signals;
   - means for deriving an equalized binary coded signal;
   - means for sensing an error in each one of said $k$ equalized binary coded signals; and for generating error indications from said sensing means;
   - means controlled by said error generating means for correcting each one of said $k$ coefficients according to each said error indication;
   - means for digitally combining said quantized binary coded signal and said corrected coefficients to obtain said equalized binary coded signal; and
   - means for decoding said equalized binary coded signal.

7. Apparatus for equalizing the distortion caused by the passage of a multifrequency pulse signal through a nonideal transmission channel comprising:
   - means for quantizing said pulse signal into an $n$ digit binary code at predetermined equally spaced time intervals determined by the digit rate of the multifrequency signal received from the transmission channel;
   - means for storing $k$ samples of said time-spaced quantized signals and discarding the $k+1$ sample of said signal;
   - means for deriving $k$ coefficients in digital form;
   - means for deriving an equalized quantized binary coded signal;
   - means for sensing the error polarity of each one of the equalized quantized signals, said sensing means generating an error signal;

combining means responsive to said error signal and to the first mentioned quantized signal generating a correcting signal for updating each one of said $k$ coefficients;

means for multiplying said quantized signal by said updated coefficients to obtain corrected quantized signal samples;

means for accumulating the $k$ corrected quantized signal samples to obtain said equalized quantized signal; and means for decoding said equalized quantized signal to obtain a replica of the transmitted signal.

8. Apparatus as set forth in claim 7 in which said quantizing means comprises:

means for sampling the received signal at the bit rate; and means for converting said bit sample into an $n$ digit code.

9. Apparatus as set forth in claim 8 in which said converting means comprises an analog-to-digital converter, said converter providing an $n$ digit output that is representative of the sampled input signal at the bit rate.

10. Apparatus as set forth in claim 7 in which said storing means comprises $n$ shift registers, one for each digit of said code, each shift register having $k$ stages for storage of $k$ time-spaced quantized signals.

11. Apparatus as set forth in claim 7 in which said coefficient deriving means comprises:

coefficient storage means having $n$ inputs and $n$ outputs and having $k$ stages with each stage corresponding to one sample of the $k$ quantized signal samples;

an $n$ stage counter having $n$ inputs and $n$ outputs corresponding to those of the coefficient storage means, separate stages of the counter and storage being interconnected with the output of a coefficient storage stage being connected to the input of the associated counterstage and the output of said counter being connected to the input of said storage stage, said counterstages further having a control means responsive to said correcting signal;

timing means for reading the present coefficient from the output of said coefficient storage means into the input of said countermeans, one quantized sample at a time on a predetermined time basis for timing the correcting signal input to said counterstages to update the coefficients, and for timing the reading of said updated coefficient from the counter into one input of said multiplier and into said coefficient storage.

12. Apparatus as set forth in claim 7 in which said sensing means comprises:

logic circuitry for implementing the following relationship to obtain one binary indication as an error signal for a positive error $+\epsilon$, where $$+\epsilon=\overline{S}_0 S_1 S_2 \ldots S_n+\overline{S}_1\overline{[S_0\overline{S}_2 \ldots \overline{S}_n]}\ ;$$

and, to obtain the other binary indicating as an error signal for a negative error $-\epsilon$, where $$-\epsilon=S_0\overline{S_1 S_2} \ldots \overline{S}_n+S_1\overline{[\overline{S}_0 S_2 \ldots S_n]}$$

13. Apparatus as set forth in claim 7 in which said combining means comprises an Exclusive-OR gate.

14. A decision-directed adaptive equalizer for a band-limited transmission channel comprising:

means for converting a received data signal to an $n$-digit input coded signal at the data rate of the received signal; and means for sequentially combining the $n$-digit coded signals with coefficients which are continuously updated and satisfy the relationship $C_{J+1}=C_J-P \operatorname{sgn} \epsilon_J \operatorname{sgn} X_{IJ}$, wherein $C_J$ is a present value of a coefficient, $C_{J+1}$ is the next value of the coefficient $C_J$, $P$ is a constant which may be positive or negative, sgn $\epsilon_J$ represents the sign of the difference between an actual value and an estimated value of an $n$-digit coded signal, sgn $X_{IJ}$ represents the sign of an $n$-digit input coded signal, and $i$ and $j$ are indexing subscripts for producing an equalized $n$-digit coded signal.

15. The equalizer according to claim 14 wherein the coefficients are represented by a like number of digits.

16. The equalizer according to claim 15 including first means responsive to the operation of said converting means for storing $k$ different $n$-digit input coded signals.

17. The equalizer according to claim 16 wherein such storing means periodically dumps a stored input coded signal and receives a new input coded signal.

18. The equalizer according to claim 16 wherein said combining means includes means for summing the prescribed number of input coded signals and coefficients to produce an equalized coded signal.

19. The equalizer according to claim 18 including means for deriving the coefficients comprising:

error sensing logic responsive to the equalized coded signal for generating an error signal related to the sign of the error between the equalized signal and an estimated value thereof, and means for producing control signals related to the polarities of input coded signals.

20. The equalizer according to claim 19 including first means responsive to the operation of said converting means for storing $k$ different $n$-digit input coded signals, said first storing means periodically dumping a stored input coded signal and receiving a new input coded signal; and wherein said deriving means includes second means for storing $k$ each $n$-digit coefficients $C_J$, and means periodically responsive to the error signal, the control signal and coefficients $C_J$ stored in said second storing means for producing an updated coefficient $C_{J+1}$ which is applied to said combining means and recycled into said second storage means.

21. The equalizer according to claim 20 wherein said updated coefficient producing means comprises means for cross correlating the error and control signals for producing a correlated signal which determines whether a coefficient is updated by increasing or decreasing the value thereof.

22. The equalizer according to claim 21 including means for decoding the equalized coded signal for producing an equalized output data signal in the same form as the input data signal.

23. The equalizer according to claim 14 wherein said combining circuit is a multiplier.

* * * * *

UNITED STATES PATENT OFFICE
CERTIFICATE OF CORRECTION

Patent No. 3,633,105 Dated January 4, 1972

Inventor(s) Adam Lender and Henry H. P. Olszanski

It is certified that error appears in the above-identified patent and that said Letters Patent are hereby corrected as shown below:

Front page [45], "April 1, 1972" should read -- Jan. 4, 1972 --; [73] "Northlake, Del." should read -- Northlake, Ill. --; and in the abstract, line 6, "alogorithm" should read -- algorithm --. Column 4, line 53 "; and" should read -- the --. Column 7, Table A, under Binary, the last line " 0 0 1 0 " should read -- 0 0 0 0 --. Column 13, Table E, second error polarity indication above underflow line, " $-\varepsilon$ " should read -- $+\varepsilon$ --. Column 17, line 50, "produce" should read -- product --. Column 18, line 15, "k of digits" should read -- of k --; line 19, after "said" insert -- k --; and line 26 after "the" insert -- k --. Column 19, line 31 "counterstage" should read -- counter stage --; line 33, "counterstages" should read -- counter stages --; line 37, "countermeans" should read -- counter means --; and line 39, "counterstages" should read -- counter stages --.

Signed and sealed this 29th day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334